United States Patent [19]

Murayama et al.

[11] 4,207,599
[45] Jun. 10, 1980

[54] RUN LENGTH ENCODING AND DECODING PROCESS AND APPARATUS

[75] Inventors: Noboru Murayama; Hayashi Taniguchi; Akira Konishi; Hisashi Matsuda, all of Tokyo, Japan

[73] Assignee: Ricoh Company, Ltd., Tokyo, Japan

[21] Appl. No.: 900,000

[22] Filed: Apr. 25, 1978

[30] Foreign Application Priority Data

Apr. 28, 1977 [JP] Japan ................... 52-49246

[51] Int. Cl.² ...................... H04N 1/00; H04N 1/40
[52] U.S. Cl. ........................ 358/261; 340/347 DD
[58] Field of Search ...................... 358/260, 261; 340/347 DD

[56] References Cited

U.S. PATENT DOCUMENTS

| | | | |
|---|---|---|---|
| 3,588,329 | 6/1971 | Monk | 340/347 DD |
| 3,925,780 | 12/1975 | Van Voorhis | 358/261 |
| 3,980,809 | 9/1976 | Cook | 358/261 |
| 4,028,731 | 6/1977 | Arps | 358/261 |

Primary Examiner—Howard W. Britton
Attorney, Agent, or Firm—David G. Alexander

[57] ABSTRACT

Binary data is generated by a facsimile scanner or the like. A binary run length code indicating a number of successive "1" or "0" bits in the data is formed. A shift code comprising all "0" or "1" bits in a number equal to the number of the run length code is appended to the run length code only when the run length code is longer than a preceding run length code. A shorter run length code is indicated by inserting logical "0" bits in vacant high order places of the run length code so as to make the run length code equal in length to the previous run length code.

16 Claims, 4 Drawing Figures

ENCODING PROCESS

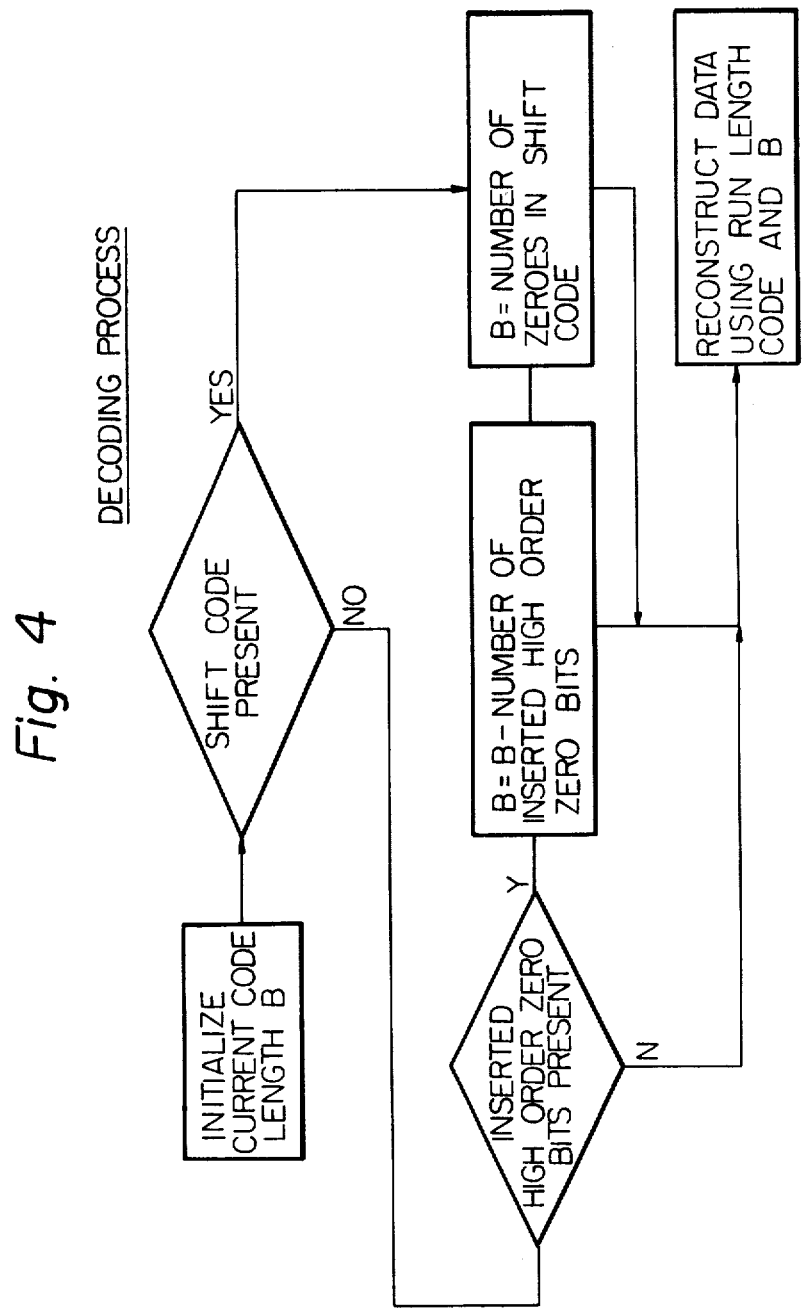

RUN LENGTH ENCODING AND DECODING PROCESS AND APPARATUS

BACKGROUND OF THE INVENTION

The present invention relates to a run length encoding and decoding process and apparatus for transmitting facsimile and similar binary data in compressed form.

A number of run length encoding systems have been developed including variable length block encoding, Wyle encoding, Huffman encoding, etc. The variable length block and Wyle encoding systems utilize flag bits to indicate the length of a run length code. These flag bits are either mixed with the bits of the run length code as in the case of variable length block encoding or are separate from the run length code as in the case of the Wyle encoding system. These flag bits account for between ⅓ and ½ of the data transmitted. The Huffman encoding system does not use flag bits but instead assigns a unique binary code to each run length, with the shorter codes corresponding to the most frequently occuring run lengths.

All of these prior art encoding systems suffer from the drawback that where the same run length is encountered several times in succession, the entire run length code including the flag bits where applicable is transmitted each time. If there is no change in run length, the flag bits are redundant. Likewise, the flag bits are transmitted when the run length decreases. This high percentage of redundant data greatly limits the degree of data compression and transmission speed.

SUMMARY OF THE INVENTION

The present invention overcomes the drawbacks of the prior art by generating a binary run length code indicating a run length of binary data. A shift code comprising a number of all logical "1" or "0" bits in a number equal to the number of bits in the run length code is appended to the run length code only when the run length code is longer than a preceding run length code. A shorter run length code is indicated by inserting logical "0" bits in vacant high order places of the run length code so as to make the run length code equal in length to the previous run length code.

It is an object of the present invention to provide a run length encoding and decoding process which greatly increases the data compression rate over the prior art.

It is another object of the present invention to provide a run length encoding and decoding process which greatly increases the data transmission speed over the prior art.

It is another object of the present invention to provide a run length encoding and decoding process which eliminates a high percentage of redundant data which is inherent in prior art processes.

It is another object of the present invention to provide a generally improved run length encoding and decoding process.

It is another object of the present invention to provide an apparatus embodying the present process.

Other objects, together with the foregoing, are attained in the embodiments described in the following description and illustrated in the accompanying drawing.

BRIEF DESCRIPTION OF THE DRAWING

FIG. 4 is a flowchart of the operation of the decoding apparatus.

DESCRIPTION OF THE PREFERRED EMBODIMENTS

Figure 1:
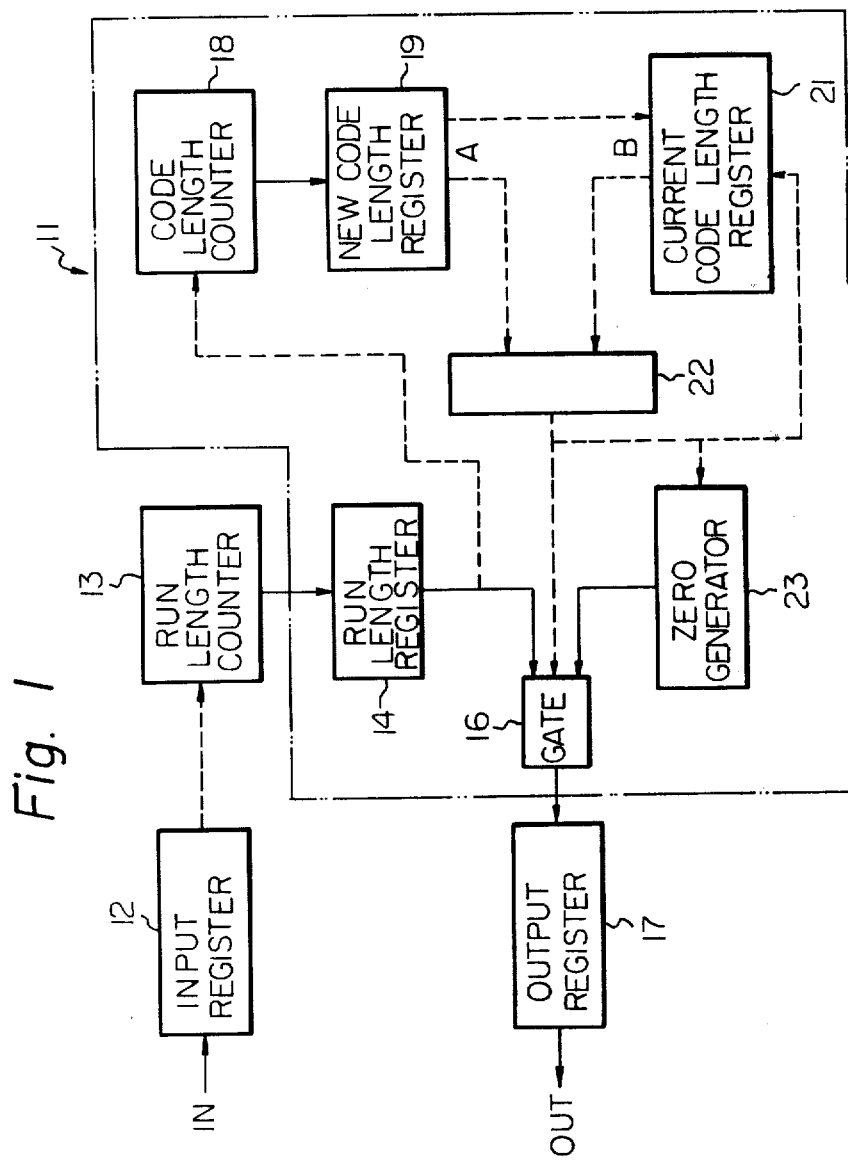
FIG. 1 is a block diagram of an encoding apparatus for performing the present process.
Figure 2:
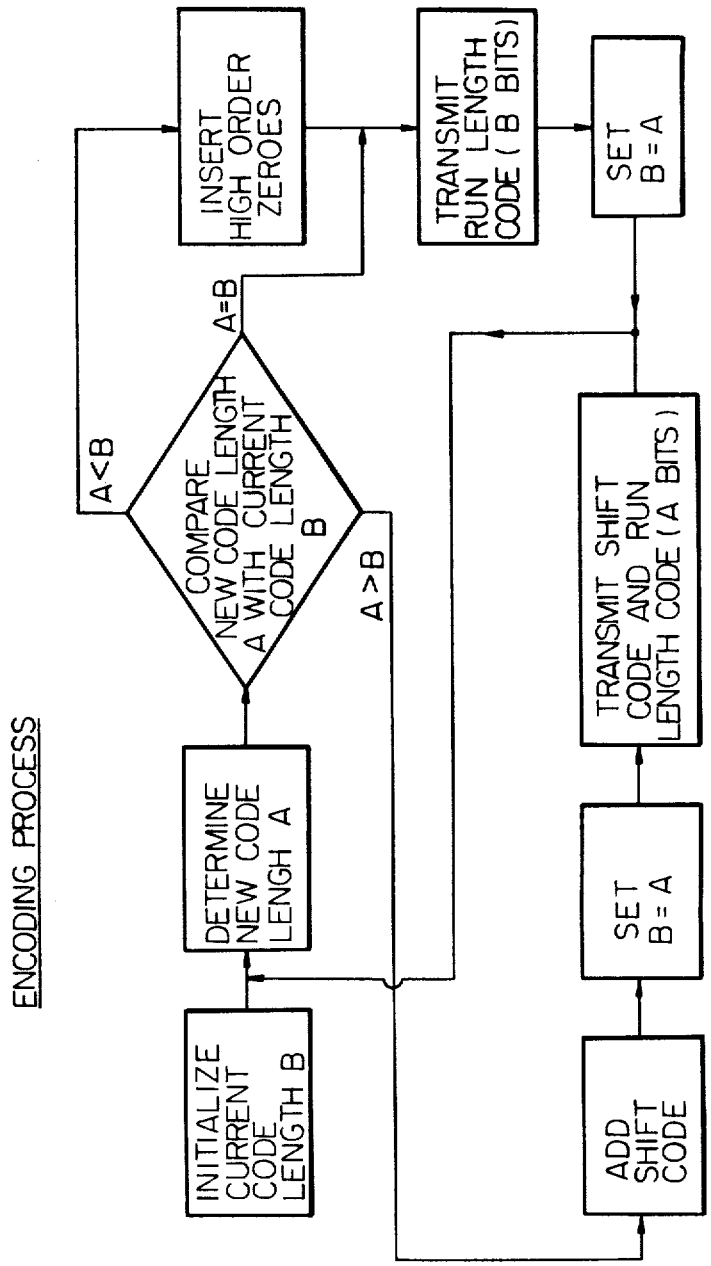
FIG. 2 is a flowchart of the operation of the encoding apparatus.

While the run length encoding and decoding process of the invention is susceptible of numerous physical embodiments, depending upon the environment and requirements of use, substantial numbers of the herein shown and described embodiments have been made, tested and used, and all have performed in an eminently satisfactory manner.

An example of variable length block encoding of the prior art is illustrated in table 1. In the first system the binary bits indicating the run length are not underlined and are alternated with flag bits which are underlined. The flag bits indicate the length of the run length code and are provided in a number equal to the run length code bits. Thus, the flag bits constitute 50% of the encoded data transmitted. Where the same run length occurs several times in a row, the flag bits constitute redundant data. In the second system, there is one flag bit for each two data bits, thus reducing the redundancy to 33%. Although the second system is an improvement over the first system in this respect, it still unnecessarily limits the compression and transmission rates.

Table 2 illustrates the prior art Wyle encoding system, in which the symbol # indicates the bits of the run length code. It will be seen that the number of flag bits is generally equal to the number of data bits, for a redundancy of 50% when the same run length is transmitted several times in succession. The main difference between the Wyle system and the variable length block systems is that the flag bits are separated from the data bits in the Wyle system.

Table 3 illustrates the prior art Huffman encoding system which does not comprise any flag bits. Instead, there is a unique code for each run length, with the codes for the most frequency encountered run length having the smallest number of bits. It will be noted that some of the codes are quite long compared to the actual run length.

In all of the prior art systems it is only possible to produce binary numbers indicating the run lengths by means of complicated computational operations on the codes.

Table 1

| Run length | Code (first system) | Code (second system) |
|---|---|---|
| 1 | 00 | 000 |
| 2 | 01 | 001 |
| 3 | 1000 | 010 |
| 4 | 1001 | 011 |
| 5 | 1100 | 100000 |
| 6 | 1101 | 100001 |
| 7 | 101000 | 100010 |
| 8 | 101001 | 100011 |
| 9 | 101100 | 101000 |
| 10 | 101101 | 101001 |
| . | . | . |
| . | . | . |
| . | . | . |

Table 1-continued

| Run length | Code (first system) | Code (second system) |
|---|---|---|
| . | . | . |

Table 2

| Run length | Code | | No. of bits |
|---|---|---|---|
| | Flag | Run length Code | |
| 1 ~ 4 | 0 | ## | 3 |
| 5 ~ 8 | 10 | ## | 4 |
| 9 ~ 16 | 110 | ### | 6 |
| 17 ~ 32 | 1110 | #### | 8 |
| 33 ~ 64 | 11110 | ##### | 10 |
| 65 ~ 128 | 111110 | ##### | 12 |
| 129 ~ 256 | 1111110 | ###### | 14 |
| 257 ~ 512 | 11111110 | ####### | 16 |
| 513 ~ 1024 | 111111110 | ######## | 18 |
| 1025 ~ 2048 | 1111111110 | ######### | 20 |

Table 3

| Run Length | Run length Code (white) | Run length Code (black) |
|---|---|---|
| 0 | 11001111 | 0000100100 |
| 1 | 000000 | 001 |
| 2 | 1110 | 01 |
| 3 | 1011 | 10 |
| 4 | 0110 | 110 |
| 5 | 0010 | 1110 |
| 6 | 0011 | 00010 |
| 7 | 1001 | 000001 |
| 8 | 00010 | 000011 |
| 9 | 01001 | 000110 |
| 10 | 10101 | 0000000 |
| 11 | 01010 | 0000101 |
| 12 | 000111 | 0001111 |
| 13 | 011100 | 00001000 |
| . | . | . |

Table 4 illustrates a run length encoding system of the present invention which overcomes the drawbacks of all of the prior art systems. It will be seen that a run length code RL for each run length is simply the value of the run length written in binary form. Thus, the run length code for a run length of decimal 5 is binary 101, etc. A shift code SC comprising a plurality of logical "0" bits is appended to the highest order bit of a run length code RL where the code length increases. Table 4 shows underlined "0" bits in high order places of the run length codes RL which indicate a reduction in run length in a manner which will be described in detail below.

Table 5 shows the run length codes RL and shift codes SC of table 4 for monotonically increasing run lengths from 1 to 10 and monotonically decreasing run lengths from 10 to 1. It will be seen that a shift code SC is only appended to the run length code RL when the number of bits (code length) of the run length code is greater than the number of bits of the previous run length code. For example, if the run length increases from 7 to 8, the complete code for the run length of 8 will be 00001000. The leftmost four "0" bits are the shift code SC. The rightmost four bits are the run length code RL and constitute the binary equivalent of the run length 8. However, if two successive run lengths of 7 are encountered, the complete code for the second run length will be 111, constituting only the run length code RL. Where a run length code has a number of bits greater than that of the previous run length code, a shift code comprising "0" bits equal in number to the number of bits of the new run length code is appended to the high order bit of the new run length code.

Table 4

| Run length Code length | $2^1$ | $2^2$ | $2^3$ | $2^4$ | $2^5$ |
|---|---|---|---|---|---|
| Shift Code SC | 0 | 00 | 000 | 0000 | 00000 |
| Run length | | | | | |
| 1 | 1 | 01 | 001 | 0001 | 00001 |
| 2 | | 10 | 010 | 0010 | 00010 |
| 3 | | 11 | 011 | 0011 | 00011 |
| 4 | | | 100 | 0100 | 00100 |
| 5 | | | 101 | 0101 | 00101 |
| 6 Run length | | | 110 | 0110 | 00110 |
| 7 binary | | | 111 | 0111 | 00111 |
| 8 Code RL | | | | 1000 | 01000 |
| 9 | | | | 1001 | 01001 |
| 10 | | | | 1010 | 01010 |
| . | | | | . | . |
| . | | | | . | . |
| . | | | | . | . |

Table 5

| | Run length | Shift Code SC | Run length binary Code RL |
|---|---|---|---|
| ↑ | 1 | 0 | 1 |
| ↑ | 2 | 00 | 10 |
| ↑ | 3 | | 11 |
| ↑ | 4 | 000 | 100 |
| increase ↑ | 5 | | 101 |
| ↑ | 6 | | 110 |
| ↑ | 7 | | 111 |
| ↑ | 8 | 0000 | 1000 |
| ↑ | 9 | | 1001 |
| • | 10 | | 1010 |
| ↓ | 9 | | 1001 |
| ↓ | 8 | | 1000 |
| ↓ | 7 | | 0111 |
| ↓ | 6 | | 110 |
| decrease ↓ | 5 | | 101 |
| ↓ | 4 | | 100 |
| ↓ | 3 | | 011 |
| ↓ | 2 | | 10 |
| ↓ | 1 | | 01 |

The new run length code RL and the code length (number of bits in the new run length code) are determined by sensing the high order places of the complete code which comprises the run length code RL and may further comprise the shift code SC. The present system will be well understood from the following description with reference being made to tables 4 and 5 and FIGS. 1 to 4.

In FIG. 1 an encoding apparatus of the present invention is generally designated by the reference numeral 11 and comprises an input shift register 12. The output of the register 12 is connected to an input of a run length counter 13, the output of which is connected to an input of a run length register 14. The output of the register 14 is connected through a gate 16 to an input of an output register 17.

The output of the register 14 is also connected to an input of a code length counter 18, the output of which is connected to an input of a new code length register 19. The output of the register 19 is connected to inputs of a current code length register 21 and a comparator 22. The output of the comparator 22 is connected to inputs of the register 21, gate 16 and a zero generator 23.

Figure 3:
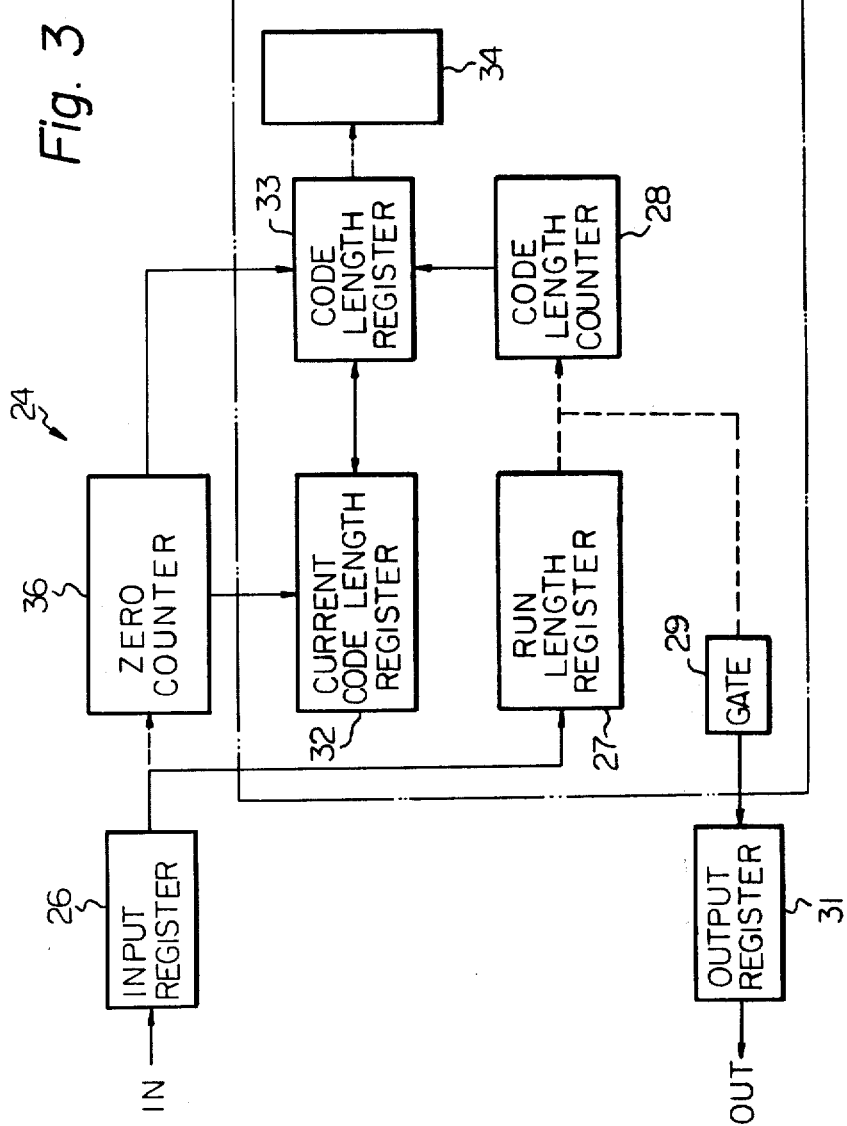
FIG. 3 is a block diagram of decoding apparatus for performing the present process.

Initially, a predetermined initial current code length B is set into the register 21 and also into a similar register in a decoding apparatus which is shown in FIG. 3 (to be described later). Then binary data from a facsimile scanner or the like (not shown) is serially fed through the register 12. The counter 13 counts the number of successive logical "0" to "1" bits. A central control unit (not shown) stops shifting of the register 12 in response to a transition from "0" bits to "1" bits or vice-versa. Subsequent "1" and "0" data runs are encoded alternatingly.

For example, if the input data comprises a string of 6 logical "0" bits, the run length is 6 and the run length code RL is 110. The run length code RL appears at the output of the counter 13 and is set into the register 14.

Then the counter 18 counts the number of significant bits in the run length code RL and sets this number, a new code length A, into the register 19. The comparator 22 then compares the new code length A with the current code length B.

When A=B, the new code length A is set into the register 21 (there is no change in the numerical value) and the run length code RL is fed from the register 14 and gate 16 into the register 17 from which it is serially transmitted to the decoding apparatus. In this case, the run length code RL consists of B bits (equal to A bits). When A>B, the value of A is set into the register 21 to update the current code length B. Then, the zero generator 23 feeds A "0" bits through the gate 16 into the register 17 to constitute the shift code SC for the new run length. Then, the run length code RL is fed from the register 14 through the gate 16 into the register 17 behind the shift code SC. The run length code RL has A bits, or the same number of bits as the shift code SC.

When A<B, the zero generator 23 feeds "0" bits through the gate 16 into the register 17. The number of these "0" bits is equal to A-B. Then, the run length code RL (A bits) is fed from the register 14 through the gate 16 into the register 17 behind the "0" bits. Then, the new code length A is set into the register 21.

For example, if the current code length B (which except in the case of the first run length is equal to the code length of the previous run length code) is 4 and the new run length is 3, the run length code RL stored in the register 14 is binary 11 and comprises 2 bits. The zero generator 23 will insert two "0" bits in the vacant high order places of the run length code RL to alter the code to the form 0011. The underlining indicates the inserted "0" bits. It will be seen that the new run length code RL in altered form comprises the same number of bits as the previous run length code (4 bits), or has a code length equal to the current code length B.

The inserted "0" bits indicate to the decoding apparatus that the run length has decreased. It will be noted that the current code length in the decoding apparatus is B. If the code length were to increase from 4 bits to 5 bits, the new code would comprise a shift code of 5 "0" bits. However, the code in the present example has only 2 high order "0" bits, indicating that the code length has decreased rather than increased. Since there are two inserted high order "0" bits, it can be determined that the code length has decreased by two bits, or from 4 to 2 bits. In this manner, it is impossible to confuse shift code "0" bits with inserted "0" bits.

FIG. 3 illustrates a decoding apparatus of the present invention which is generally designated as 24 and comprises an input register 26 through which the transmitted codes from the apparatus 11 are shifted. The output of the register 26 is connected to an input of a run length register 27, the output of which is connected to inputs of a code length counter 28 and a gate 29. The output of the gate 29 is connected to an input of an output register 31, the output of which is connected to a facsimile recording device or the like (not shown).

The current code length B is stored in a current code length register 32 which is connected to a code length register 33. The code length counter 28 has an output connected to the code length register 33. Further connected to the code length register 33 is a zero detector 34. A zero counter 36 has an input connected to the output of the register 26 and outputs connected to the register 32 and the register 33.

In operation, the code from the apparatus 11 is shifted into the input register 26, and B bits of the code are shifted into the register 26 therefrom. The code length counter 28 counts the number of significant bits of the code in the register 28 and sets the same into the register 33. The zero detector 34 senses whether the number of significant bits is zero. If so, the contents of the register 27 constitute a shift code SC rather than a run length code RL. A central control unit (not shown) then causes the register 26 to shift out any remaining high order "0" bits. The number of such bits is counted to the zero counter 36 and algebraically added to the current code length B in the register 32. It will be noted that there must be at least one additional high order "0" bit in the register 26 if the code length increases. By this action, the contents of the register 32 are updated so that the current code length B becomes equal to the new code length A. Then, the register 26 is shifted a plurality of times equal to the number in the register 32 and the contents of the register 26 shifted into the register 27. This second shifting operation of the registers 26 and 27 causes the run length code RL to be shifted into the register 27.

The central control unit operates the gate 29 in such a manner as to gate a plurality of "0" or "1" bits depending on whether a "0" or "1" run length was transmitted into the output register 31 to reconstruct the binary data. The number of bits gated into the register 31 is equal to the value of the run length code RL in the register 27, or equal to the run length. The gate 29 operates to apply logical "0" or "1" output signals to the register 31 in synchronism with shifting of the register 31 under control of the central control unit. For example, where a logical "1" run length of 12 bits was encoded by the apparatus 11, 12 logical "1" bits will be fed into the register 31 by the apparatus 24 in response thereto, thus exactly reconstructing the original binary data.

Where the count in the counter 28 is not zero, it indicates that the code length has not increased. When A=B, there will be no high order "0" bits in the code, and the count of the zero counter 36 will be zero. In this case, the run length code RL in the register 27 is used to control the gate 29 in the manner described above. Thus, there is only one shifting operation from the register 26 to the register 27.

When A<B, the count in the counter 28 is not zero and is fed through the register 33 into the register 32. This updates the code length B to correspond to the reduced code length. The run length code RL in the register 27 is used to control the gate 29 in an essentially similar manner. In this case, the operation is mathematically equivalent to reducing the current code length B by the number of inserted high order "0" bits.

Tables 6 and 7 illustrate a modified run length encoding system of the present invention in which the run length codes RL have values equal to the run lengths minus one. This system allows the frequently encountered run length 4 to be indicated by RL=11 rather then RL=100, or by a two bit rather than a three bit code. In order to distinguish the run length code RL for the run length of 1 from a shift code bit, the run length code for the run length of 1 is indicated as RL=1. However, a zero shift code is defined in this system so that the run length codes for run lengths 1 and 2, which are both indicated by a low order "1" bit, may be distinguished from each other. In reconstructing the binary data, the run length code is increased by one (except for run length 1) by the decoding apparatus.

Tables 8 and 9 illustrate another encoding system of the present invention in which the shift code is constituted by logical "1" rather than "0" bits. In order to distinguish the shift code bits from run length code bits, a signal "0" flag bit is inserted between the shift code and the run length code. It will also be noted in tables 8 and 9 that the run length codes are equal to the run lengths minus one.

In order to eliminate ambiguity in decoding, logical "0" discriminator bits are appended to the lower order bits of the maximum value run length codes for each run length when the run length code increases. These discriminator bits are underlined in tables 8 and 9. This positively prevents confusion between low order "1" run length code bits and subsequent high order "1" shift code bits.

Table 6

| Run length Code length Shift Code SC | $2^0$ | $2^1$ 0 | $2^2$ 00 | $2^3$ 000 | $2^4$ 0000 |
|---|---|---|---|---|---|
| Run length 1 | 1 | 01 | 001 | 0001 | 00001 |
| 2 | | 1 | 01 | 001 | 0001 |
| 3 | | | 10 | 010 | 0010 |
| 4 | | | 11 | 011 | 0011 |
| 5 | | | | 100 | 0100 |
| 6 | | | | 101 | 0101 |
| 7 Run | | | | 110 | 0110 |
| 8 length | | | | 111 | 0111 |
| 9 Code RL | | | | | 1000 |
| 10 | | | | | 1001 |
| 11 | | | | | 1010 |
| 12 | | | | | 1011 |
| . | | | | | . |
| . | | | | | . |

Table 7

| | | Run | Code | |
| | No. | length | Shift Code SC | Run length binary Code RL |
|---|---|---|---|---|
| | ↑ a | 1 | | 1 |
| | ↑ b | 1 | | 1 |
| | ↑ c | 2 | 0 | 1 |
| increase | ↑ d | 2 | | 1 |
| | ↑ e | 3 | 00 | 10 |
| | ↑ f | 3 | | 10 |
| | ↑ g | 4 | | 11 |
| | ↑ h | 4 | | 11 |
| | • i | 5 | 000 | 100 |
| | ↓ j | 5 | | 100 |
| | ↓ k | 4 | | 011 |
| | ↓ l | 4 | | 11 |
| | ↓ m | 3 | | 10 |
| decrease | ↓ n | 3 | | 10 |
| | ↓ o | 2 | | 01 |
| | ↓ p | 2 | | 1 |
| | ↓ q | 1 | | 01 |
| | ↓ r | 1 | | 1 |

Table 8

| Run length Code length Shift Code SC + flag bit (0) | $2^0$ | $2^1$ 10 | $2^2$ 110 | $2^3$ 1110 | $2^4$ 11110 |
|---|---|---|---|---|---|
| Run length 1 | | 0 | 00 | 000 | 0000 |
| 2 | | 10 | 01 | 001 | 0001 |
| 3 | | | 10 | 010 | 0010 |
| 4 | | | 110 | 011 | 0011 |
| 5 | | | | 100 | 0100 |
| 6 | | | | 101 | 0101 |
| 7 | | | | 110 | 0110 |
| 8 | | | | 1110 | 0111 |
| 9 Run | | | | | 1000 |
| 10 length | | | | | 1001 |
| 11 Code RL | | | | | 1010 |
| 12 | | | | | 1011 |
| 13 | | | | | 1100 |
| 14 | | | | | 1101 |
| 15 | | | | | 1110 |
| 16 | | | | | 11110 |
| . | | | | | . |
| . | | | | | . |

Table 9

| | | Run | Code | | |
| | No. | length | Shift Code SC | flag | Run length Code RL |
|---|---|---|---|---|---|
| | ↑ a | 1 | 1 | 0 | 0 |
| | ↑ b | 2 | | | 10 |
| | ↑ c | 3 | 11 | 0 | 10 |
| increase | ↑ d | 4 | | | 110 |
| | ↑ e | 5 | 111 | 0 | 100 |
| | ↑ f | 6 | | | 101 |
| | ↑ g | 7 | | | 110 |
| | ↑ h | 8 | | | 1110 |
| | • i | 9 | 1111 | 0 | 1000 |
| | ↓ j | 10 | | | 1001 |
| | ↓ k | 9 | | | 1000 |
| | ↓ l | 8 | | | 0111 |
| | ↓ m | 7 | | | 110 |
| decrease | ↓ n | 6 | | | 101 |
| | ↓ o | 5 | | | 100 |
| | ↓ p | 4 | | | 011 |
| | ↓ q | 3 | | | 10 |
| | ↓ r | 2 | | | 01 |
| | ↓ | 1 | | | 0 |

In summary, it will be seen that the present invention greatly increases the degree of compression in run length encoding and increases transmission speed by eliminating redundant code bits.

Various modifications will become possible for those skilled in the art after receiving the teachings of the present disclosure without departing from the scope thereof.

What is claimed is:

1. A process for run length encoding and decoding of binary data for facsimile transmission, an encoding portion of the process comprising the steps of:

(a) generating a run length code comprising a plurality of binary bits indicating a run length of the data;

(b) computing a new code length as being equal to a number of bits of the run length code;

(c) comparing the new code length with a current code length;

(d) when the new code length is shorter than the current code length altering the run length code so as to comprise a number of bits indicated by the current code length by inserting logical "0" bits in vacant high order places of the run length code and setting the current code length equal to the new code length; and (e) when the new code length is longer than the current code length appending a shift code comprising a plurality of identical binary bits equal in number to the new code length to the run length code and setting the current code length equal to the new code length;

a decoding portion of the process comprising the steps of:

(f) sensing for presence of the shift code and setting the current code length equal to the number of bits of the shift code when the shift code is present;

(g) when the shift code is absent sensing for presence of inserted logical "0" bits and subtracting the number of inserted logical "0" bits from the current code length where inserted logical "0" bits are present; and subsequently (h) reconstructing the binary data as indicated by the run length code and current code length.

2. A process as in claim 1, in which step (e) comprises appending the shift code in the form of all logical "0" bits.

3. A process as in claim 1, in which step (e) comprises appending the shift code in the form of all logical "1" bits and inserting a logical "0" flag bit between the shift code and the run length code.

4. A process as in claim 1, in which step (a) comprises generating the run length code as a binary code having a value equal to the run length.

5. A process as in claim 1, in which step (a) comprises generating the run length code as a binary code having a value equal to the run length minus one.

6. A process as in claim 5, in which step (a) comprises adding a binary "1" to the run length code for a run length of one bit.

7. A process as in claim 3, in which step (e) comprises appending a logical "0" discriminator bit to the low order bit of the run length code when the new code length is equal to the current code length and all bits of the run length code are logical "1", steps (f) and (g) comprising sensing for the presence of the discriminator bit.

8. A run length encoding process for facsimile transmission comprising the steps of:
(a) generating a run length code comprising a plurality of binary bits indicating a run length of binary data;
(b) computing a new code length as being equal to a number of bits of the run length code;
(c) comparing the new code length to a current code length; and
(d) when the new code length is longer than the current code length appending a shift code indicating the new code length to the run length code and setting the current code length equal to the new code length.

9. An apparatus for run length encoding and decoding of binary data, an encoding portion of the apparatus comprising;
code generating means for generating a run length code comprising a plurality of binary bits indicating a run length of the data;
computing means for computing a new code length as being equal to a number of bits of the run length code;
comparator means for comparing the new code length with a current code length; and
alteration means;
when the new code length is shorter than the current code length the alteration means altering the run length code so as to comprise a number of bits indicated by the current code length by inserting logical "0" bits in vacant high order places of the run length code and setting the current code length equal to the new code length; and
when the new code length is longer than the current code length the alteration means appending a shift code comprising a plurality of identical binary bits equal in number to the new code length to the run length code and setting the current code length equal to the new code length;
a decoding portion of the apparatus comprising:
sensor means for sensing for presence of the shift code and setting the current code length equal to the number of bits of the shift code when the shift code is present;
when the shift code is absent the sensor means sensing for presence of inserted logical "0" bits and subtracting the number of inserted logical "0" bits from the current code length where inserted logical "0" bits are present; and
reconstruction means for reconstructing the binary data as indicated by the run length code and current code length.

10. An apparatus as in claim 9, the alteration means appending the shift code in the form of all logical "0" bits.

11. An apparatus as in claim 9, the alteration means appending the shift code in the form of all logical "1" bits and inserting a logical "0" flag bit between the shift code and the run length code.

12. An apparatus as in claim 9, the code generating means generating the run length code as binary code having a value equal to the run length.

13. An apparatus as in claim 9, the code generating means generating the run length code as a binary code having a value equal to the run length minus one.

14. An apparatus as in claim 13, the code generating means adding a binary "1" to the run length code for a run length of one bit.

15. An apparatus as in claim 11, the alteration means appending a logical "0" discriminator bit to the low order bit of the run length code when the new code length is equal to the current code length and all bits of the run length code are logical "1", the sensor means sensing for the presence of the discriminator bit.

16. A run length encoding apparatus comprising:
code generating means for generating a run length code comprising a plurality of binary bits indicating a run length of binary data;
computing means for computing a new code length as being equal to a number of bits of the run length code;
comparator means for comparing the new code length to a current code length; and
alteration means;
when the new code length is longer than the current code length the alteration means appending a shift code indicating the new code length to the run length code and setting the current code length equal to the new code length.

* * * * *